United States Patent

Henriksen

[11] Patent Number: 5,244,326
[45] Date of Patent: Sep. 14, 1993

[54] CLOSED END RIDGED NECK THREADED FASTENER

[76] Inventor: Arne Henriksen, 3695 Winston Dr., Hoffman Estates, Ill. 60195

[21] Appl. No.: 885,750

[22] Filed: May 19, 1992

[51] Int. Cl.$^5$ .................... F16B 21/00; F16B 35/00; F16B 37/04

[52] U.S. Cl. .................... 411/366; 411/180; 411/339

[58] Field of Search .............. 411/173, 176, 177, 180, 411/181, 183, 301, 338, 339, 366, 399, 427, 429

[56] References Cited

U.S. PATENT DOCUMENTS

| | | | |
|---|---|---|---|
| 2,026,757 | 1/1936 | Swanstrom | 411/181 |
| 2,061,811 | 11/1936 | Sinko | 411/180 |
| 2,096,335 | 10/1937 | Nicholas | 411/180 |
| 2,307,080 | 1/1943 | Schaefer | 411/177 X |
| 3,434,521 | 3/1969 | Flora | 411/180 |
| 3,462,114 | 8/1969 | O'Dell, Sr. et al. | 411/339 X |
| 3,722,565 | 3/1973 | Miller, Jr. et al. | 411/180 |
| 4,164,971 | 8/1979 | Strand | 411/301 |
| 4,490,083 | 12/1984 | Rebish | 411/429 X |
| 5,000,636 | 3/1991 | Wallace | 411/301 X |

FOREIGN PATENT DOCUMENTS 945463 4/1974 Canada .................. 411/178

*Primary Examiner*—Neill R. Wilson
*Attorney, Agent, or Firm*—Hill, Steadman & Simpson

[57] ABSTRACT

A fastener assembly including a first fastener member adapted to be inserted into a first structural component. The first fastener member includes a head portion and a generally cylindrical shank portion extending from the head portion. The fastener assembly also includes a second fastener member having a head portion and a shank portion extending therefrom. The first and second fastener members include respective internally and externally threaded portions that interengage to secure the fastener members together. One of the fastener members is provided with anti-rotation structure that prevents rotational movement of the fastener members with respect to the structural components, while permitting non-destructive axial removal of the fastener members from the structural components. In a preferred embodiment, the anti-rotational structure is provided as a plurality of longitudinal ridges disposed on an outer surface of the shank portion of one of the fastener members. The longitudinal ridges extend along the shank portion in a direction generally parallel to the longitudinal axis of the shank portion. Each of the ridges may be triangular in cross section. The head portions or shank portions of either or both of the fastener members may be coated with a micro-encapsulated locking material.

17 Claims, 1 Drawing Sheet

CLOSED END RIDGED NECK THREADED FASTENER

BACKGROUND OF THE INVENTION

The present invention relates to a fastener assembly, and in particular to a two-piece fastener assembly having anti-rotation structure.

In building some structures (for example containers and portable shelters) it often occurs that, in order to secure structural components together, a first part of a fastener (such as a T-nut or screw) is applied from one side of the structure, and a second part of the fastener (such as a screw or a locking nut) is applied from the opposite side of the structure. Frequently, the configuration of the structure is such that the opposite side of the structure is not accessible to the person applying the first portion of the fastener. In such situations, at least two persons are required for the assembly operation. Alternatively, one person must insert all of the first fastener members from one side of the structure, and then hope that those fasteners will not fall out, be pushed out, or turn when the second parts of the fastener are being applied from the other side of the structure. Oftentimes, the first fastener members become dislodged or turned while the second fastener members are being applied, thus effectively requiring two persons to complete the operation of securing the structural components together.

As a result, some fastener members have been provided with a barb-like retention structure, as disclosed in U.S. Pat. No. 4,046,181. However, the barbed structure of these known fasteners prevents the fastener members from being non-destructively removed from the structural components. This is particularly critical when the structures are to be assembled, disassembled, and then reassembled repeatedly, as is the case with containers and portable shelters.

Consequently, it can be seen that the need exists for a fastener member that can be securely held in a structural component to facilitate ease of assembly, while providing the capability of being non-destructively removed from the structural component to facilitate disassembly and reassembly.

SUMMARY OF THE INVENTION

The present invention provides an improved fastener assembly which obviates the necessity of requiring two persons to secure structural components together, while permitting non-destructive removal of the fastener assembly from the structural components. The fastener assembly can include a first fastener member adapted to be inserted into a first structural component. The first fastener member includes a head portion and a generally cylindrical shank portion extending from the head portion. The fastener assembly also includes a second fastener member having a head portion and a shank portion extending therefrom. The first and second fastener members include respective internally and externally threaded portions that interengage to secure the fastener members together. One of the fastener members is provided with anti-rotation structure that prevents rotational movement of the fastener members with respect to the structural components, while permitting non-destructive axial removal of the fastener members from the structural components.

In a preferred embodiment, the anti-rotational structure is provided as a plurality of longitudinal ridges disposed on an outer surface of the shank portion of one of the fastener members. The longitudinal ridges extend along the shank portion in a direction generally parallel to the longitudinal axis of the shank portion. Each of the ridges may be triangular in cross section.

The head portions or shank portions of either or both of the fastener members may be coated with a microencapsulated locking material.

Other objects and advantages of the present invention will be apparent upon reference to the accompanying description when taken in conjunction with the following drawings.

DESCRIPTION OF THE PREFERRED EMBODIMENT

Figure 1:
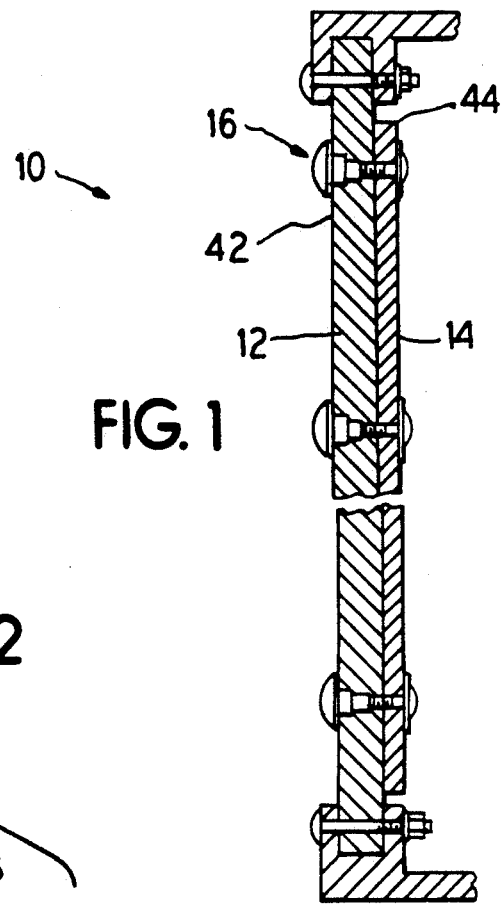
FIG. 1 illustrates a cross-sectional view of a structure incorporating fastener assemblies embodying the principles of the present invention.

FIG. 1 illustrates a portion of a structure 10 (such as a container or portable shelter) in which a first structural component 12 is secured to a second structural component 14. The first structural component 12 is secured to the second structural component 14 by means of a plurality of fastener assemblies 16.

Figure 2:
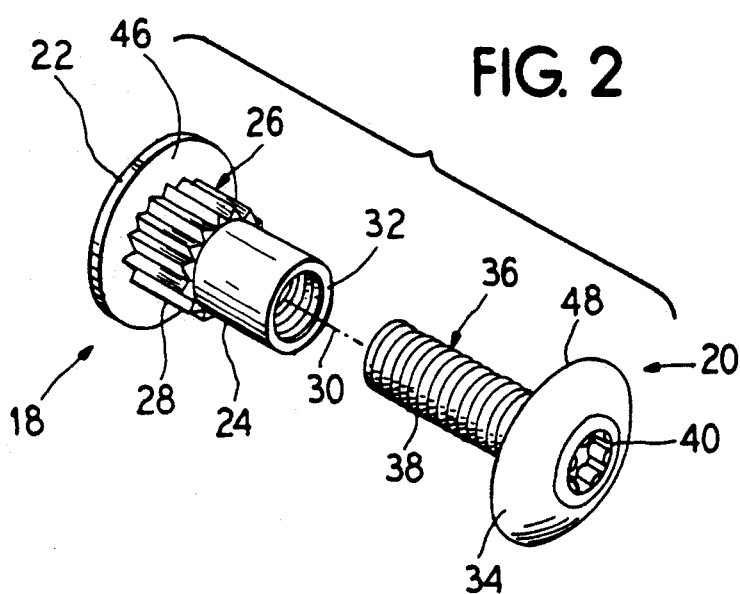
FIG. 2 illustrates a perspective view of a fastener assembly according to the present invention.
Figure 3:
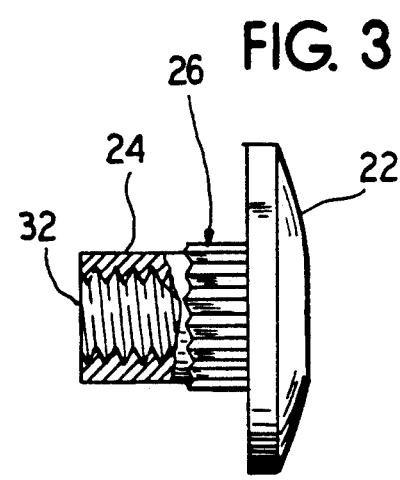
FIG. 3 illustrates an elevational view, partially broken away, of a fastener member.
Figure 4:
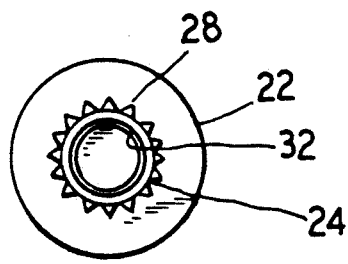
FIG. 4 illustrates a view taken generally along line IV—IV of FIG. 3.

As shown in FIGS. 2 through 4, each of the fastener assemblies 16 includes a first fastener member 18 and a second fastener member 20. The first fastener member 18 includes a generally disc-shaped head portion 22. A generally cylindrical shank portion 24 is secured to, and extends from, the head portion 22. The shank portion 24 is provided with anti-rotation structure 26 in the form of a plurality of longitudinal ridges 28. The longitudinal ridges 28 are formed on an outer peripheral surface of the shank portion 24, and extend generally parallel to a longitudinal axis 30 of the shank portion 24. The longitudinal ridges 24 have a constant height along their entire length. The shank portion 24 is provided with an internally threaded longitudinal bore 32.

The second fastener member 20 is provided with a disc-like head portion 34, from which extends a generally cylindrical shank portion 36. The shank portion 36 is provided with external threads 38 that extend along the entire length of the shank portion 36, and is adapted to threadingly engage with the internal bore 32 of the first fastener member. The head portion 34 of the second fastener member 20 is provided with a recessed portion 40 that is adapted to receive a tool for rotationally driving the second fastener member. The recessed portion 40 as shown is adapted to receive a TORX ® driving tool, but it is contemplated that the head portion 34 can be adapted to receive any suitable driving tool, such as a screwdriver or socket wrench.

The undersides of the respective head portions 22, 34 are generally planar, and have no surface irregularities other than the shank portions 24, 36.

In operation, the first fastener member 18 is inserted into a bore 42 in the structural component 12, as shown in FIG. 1. The bore 42 has a diameter that is slightly less than the diameter of the anti-rotational structure 26.

The longitudinal ridges 28 frictionally engage the inner surface of the bore 42.

After all of the first fastener members 18 have been inserted, the second structural component 14 is put into place. The second fastener members 20 are then inserted through bores 44 in the second structural component 14, and a driving tool is used to rotationally drive the second fastener member 20, thus causing the threaded shank portions 36 of the second fastener members to threadingly engage the threaded inner bores 32 of the first fastener members 18. The frictional engagement of the anti-rotation structure 26 with the inner surface of the bores 42 prevents rotational movement of the first fastener members 18 with respect to the bores 42 of the first structural component 12, as well as axial movement unless an axial force of a significant amount is applied to the first fastener member 18.

The triangular configuration of the longitudinal ridges 28 (see FIG. 4) also allows the first fastener members 18 to be non-destructively removed from the first structural component 12 upon application of a significant axial force. This advantage is particularly important in applications where disassembly and reassembly are required, such as in containers and portable shelters.

In order to further enhance the secured engagement of the fastener assembly 16 in the structure 10, it is contemplated that surfaces of the fastener assembly 16 can be coated with a micro-encapsulated locking material, such as LOCTITE ®. This locking material could be applied to the underside 46 of the head portion 22 of the first fastener member, or to the underside 48 of the head portion 34 of the second fastener member 20. A locking material is preferably always applied to the shank portion 38 of the second fastener member 20.

Although the present invention has been described with reference to a specific embodiment, those of skill in the art will recognize that changes may be made thereto without departing from the scope and spirit of the invention as set forth in the appended claims.

I claim as my invention:

1. A fastener assembly comprising:
   a first fastener member including a head portion, a generally cylindrical shank portion extending from said head portion, said shank portion having a longitudinal axis, a plurality of longitudinal ridges disposed on an outer surface of said shank portion in a direction generally parallel to said longitudinal axis of said shank portion, said longitudinal ridges having a constant height along their entire length, said longitudinal ridges being contiguous with one another such that no portion of said outer surface of said shank portion is exposed between any two of said longitudinal ridges, and an internally threaded longitudinaal bore extending into said shank portion; and
   a second fastener member including a head portion adapted to receive a means for rotationally driving said second fastener member, an externally threaded shank portion extending from said head portion and adapted to threadingly engage said internally threaded bore of said first fastener member.

2. A fastener assembly according to claim 1 comprising means applied to said fastener assembly for frictionally locking said first and second fastener members together.

3. A fastener assembly according to claim 2, wherein said means for frictionally locking comprises a locking material applied to said threaded shank of said second member.

4. A fastener assembly according to claim 2, wherein said means for frictionally locking comprises a locking material applied to a surface of at least one of said head portions.

5. A fastener assembly according to claim 1 wherein said longitudinal ridges are triangular in cross-section.

6. A fastener assembly according to claim 1, wherein said internally threaded longitudinal bore of said first fastener member comprises a blind bore.

7. A fastener assembly according to claim 1, wherein said externally threaded shank portion comprises threads disposed along an entire length of said shank portion.

8. A fastener assembly according to claim 1, wherein said head portions of said first and second fastener members comprise respective planar undersides having substantially no surface irregularities.

9. A fastener assembly for securing a first structural component to at least one other structural component, said assembly comprising:
   a first fastener member adapted to be inserted into said first structural component, said first fastener member including a head portion, a generally cylindrical shank portion extending from said head portion;
   a second fastener member including a head portion and a shank portion extending from said head portion;
   threaded means, disposed on said shank portions of said first and second fastener members, for facilitating secure engagement of said first fastener member with said second fastener member; and
   anti-rotation means, disposed on an outer surface of said shank portion of said first fastener member, for preventing rotational movement of said first fastener member with respect to said first structural component, while permitting non-destructive axial removal of said first fastener member from said first structural component, said anti-rotation means including a plurality of longitudinal ridges having a constant height along their entire length, said longitudinal ridges being contiguous with one embodiment such that no portion of said outer surface of said shank portion is exposed between any two of said longitudinal ridges.

10. A fastener assembly according to claim 9, wherein said longitudinal ridges are triangular in cross-section.

11. A fastener assembly according to claim 9, wherein said threaded means comprises:
    an internally threaded longitudinal bore formed in said shank portion of said first fastener member; and
    external threaded formed on said shank portion of said second fastener member and adapted to threadingly engage said internally threaded bore of said first fastener member.

12. A fastener assembly according to claim 9, further comprising means applied to said fastener assembly for frictionally locking said first and second fastener members together.

13. A fastener assembly according to claim 12, wherein said means for frictionally locking comprises a locking material applied to said threaded shank of said second member.

14. A fastener assembly according to claim 12, wherein said means for frictionally locking comprises a locking material applied to a surface of at least one of said head portions.

15. A fastener assembly according to claim 13, wherein said internally threaded longitudinal bore of said first fastener member comprises a blind bore.

16. A fastener assembly according to claim 13, wherein said externally threaded shank portion comprises threads disposed along an entire length of said shank portion.

17. A fastener assembly comprising:

a first fastener member including a head portion, a generally cylindrical shank portion extending from said head portion, said shank portion having a longitudinal axis, a plurality of longitudinal ridges disposed on an outer surface of said shank portion in a direction generally parallel to said longitudinal axis of said shank portion, said longitudinal ridges having a triangular cross-sectional shape and a constant height along their entire length, said longitudinal ridges being contiguous with one another such that no portion of said outer surface of said shank portion is exposed between any two of said longitudinal ridges, and an internally threaded longitudinal blind bore extending into said shank portion;

a second fastener member including a head portion adapted to receive a means for rotationally driving said second fastener member, an externally threaded shank portion extending from said head portion and adapted to threadingly engage said internally threaded bore of said first fastener member, said externally threaded shank portion having threads disposed along an entire length thereof; and a locking material applied to at least one surface of said fastener assembly, said at least one surface being selected from a group consisting of said threaded shank of said second member, said head portion of said first fastener member, and said head portion of said second fastener member.

* * * * *